United States Patent
Yokino et al.

(10) Patent No.: US 10,024,715 B2
(45) Date of Patent: Jul. 17, 2018

(54) SPECTROMETER

(71) Applicant: HAMAMATSU PHOTONICS K.K., Hamamatsu-shi, Shizuoka (JP)

(72) Inventors: Takafumi Yokino, Hamamatsu (JP); Katsumi Shibayama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/116,232

(22) PCT Filed: Feb. 3, 2015

(86) PCT No.: PCT/JP2015/052964
§ 371 (c)(1),
(2) Date: Aug. 3, 2016

(87) PCT Pub. No.: WO2015/119104
PCT Pub. Date: Aug. 13, 2015

(65) Prior Publication Data
US 2017/0010152 A1    Jan. 12, 2017

(30) Foreign Application Priority Data
Feb. 5, 2014 (JP) ................. 2014-020652

(51) Int. Cl.
*G01J 3/02*        (2006.01)
*G01J 3/28*        (2006.01)
(Continued)

(52) U.S. Cl.
CPC ........... *G01J 3/0208* (2013.01); *G01J 3/0224* (2013.01); *G01J 3/0256* (2013.01); *G01J 3/0291* (2013.01);
(Continued)

(58) Field of Classification Search
CPC .......... G01J 3/2803; G01J 3/18; G01J 3/0224; G01J 3/0291; G01J 3/0208; G01J 3/24; G01J 3/1838; G01J 3/0256
See application file for complete search history.

(56) References Cited

U.S. PATENT DOCUMENTS 6,606,156 B1 * 8/2003 Ehbets ............... G01J 3/02
                                                    356/328
6,862,092 B1 * 3/2005 Ibsen ................. G01J 3/00
                                                    356/328
(Continued)

FOREIGN PATENT DOCUMENTS

CN    103323117        9/2013
CN    103323117 A  *  9/2013
(Continued)

OTHER PUBLICATIONS

English Translation of Zhang et al. (CN 103323117), Sep. 25, 2013.*
(Continued)

*Primary Examiner* — Dominic J Bologna
(74) *Attorney, Agent, or Firm* — Drinker Biddle & Reath LLP

(57) ABSTRACT

A spectrometer includes a first spectroscopic unit and a second spectroscopic unit. A light passing part, a reflection part, a common reflection part, a dispersive part, and a light detection part included in the first spectroscopic unit are arranged along a first reference line when viewed in a Z-axis direction. A light passing part, a reflection part, the common reflection part, a dispersive part, and a light detection part included in the second spectroscopic unit are arranged along a second reference line when viewed in the Z-axis direction. The first reference line and the second reference line intersect with one another.

5 Claims, 4 Drawing Sheets

(51) Int. Cl.
*G01J 3/18* (2006.01)
*G01J 3/24* (2006.01)

(52) U.S. Cl.
CPC .............. *G01J 3/18* (2013.01); *G01J 3/1838* (2013.01); *G01J 3/24* (2013.01); *G01J 3/2803* (2013.01)

(56) References Cited

U.S. PATENT DOCUMENTS

| | | | |
|---|---|---|---|
| 2004/0195511 A1* | 10/2004 | Elmore | G01J 3/02 |
| | | | 250/339.02 |
| 2006/0038997 A1 | 2/2006 | Julian et al. | |
| 2009/0262346 A1* | 10/2009 | Egloff | G01J 3/02 |
| | | | 356/326 |
| 2013/0038874 A1* | 2/2013 | Shibayama | G01J 3/02 |
| | | | 356/326 |

FOREIGN PATENT DOCUMENTS

| | | |
|---|---|---|
| JP | 2000-298066 A | 10/2000 |
| WO | WO-00/40935 A1 | 7/2000 |
| WO | WO 02/004901 | 1/2002 |
| WO | WO-2011/125443 A1 | 10/2011 |
| WO | WO 2013/015009 | 1/2013 |

OTHER PUBLICATIONS

International Preliminary Report on Patentability dated Aug. 18, 2016 for PCT/JP2015/052964.

\* cited by examiner

SPECTROMETER

TECHNICAL FIELD

The present invention relates to a spectrometer which disperses and detects light.

BACKGROUND ART

For example, Patent Literature 1 discloses a spectrometer including a light entrance part, a dispersive part for dispersing and reflecting light incident thereon from the light entrance part, a light detection element for detecting the light dispersed and reflected by the dispersive part, and a box-shaped support for supporting the light entrance part, dispersive part, and light detection element.

CITATION LIST

Patent Literature

Patent Literature 1: Japanese Unexamined Patent Publication No. 2000-298066

SUMMARY OF INVENTION

Technical Problem

Incidentally, there may be a case in which lights in a plurality of different wavelength ranges (or polarization states) are desired to be detected using the above-described spectrometer. However, light in one type of wavelength range (or polarization state) can be merely detected in a configuration of the spectrometer disclosed in Patent Literature 1. For this reason, in order to detect lights in a plurality of different wavelength ranges (or polarization states), a detection operation needs to be performed for each wavelength range (or polarization state) desired to be detected while appropriately changing a spectrometer to be used. Further, when a plurality of sets (or spectroscopic units) of a light entrance part, a dispersive part, and a light detection element is provided in one spectrometer to simultaneously detect lights in a plurality of different wavelength ranges (or polarization states), there are problems that detection accuracy decreases, and a size of the spectrometer increases.

In this regard, an object of the present invention is to provide a spectrometer capable of attempting efficiency of a detection operation in addition to miniaturization while suppressing a decrease in detection accuracy.

Solution to Problem

A spectrometer in accordance with one aspect of the present invention includes a first spectroscopic unit having a first light passing part, a first reflection part reflecting light passing through the first light passing part, a common reflection part reflecting the light reflected by the first reflection part, a first dispersive part dispersing and reflecting the light reflected by the first reflection part and reflected by the common reflection part, and a first light detection part detecting the light dispersed and reflected by the first dispersive part, and a second spectroscopic unit having a second light passing part, a second reflection part reflecting light passing through the second light passing part, the common reflection part reflecting the light reflected by the second reflection part, a second dispersive part dispersing and reflecting the light reflected by the second reflection part and reflected by the common reflection part, and a second light detection part detecting the light dispersed and reflected by the second dispersive part, wherein the first light passing part, the first reflection part, the common reflection part, the first dispersive part, and the first light detection part are arranged along a first reference line when viewed in an optical axis direction of the light passing through the first light passing part, and the second light passing part, the second reflection part, the common reflection part, the second dispersive part, and the second light detection part are arranged along a second reference line intersecting with the first reference line in the common reflection part when viewed in an optical axis direction of the light passing through the second light passing part.

In this spectrometer, lights in a plurality of different wavelength ranges, polarization states, etc. may be simultaneously detected by a plurality of spectroscopic units, and thus efficiency of a detection operation may be achieved. In addition, in each spectroscopic unit, the light passing through the light passing part (the first light passing part or the second light passing part) is reflected by the reflection part (the first reflection part or the second reflection part) and the common reflection part in sequence, and enters the dispersive part (the first dispersive part or the second dispersive part). In this way, an incident direction of light entering the dispersive part and a divergence or convergence state of the light may be easily adjusted. Thus, in each of the spectroscopic units, even when a length of an optical path from the dispersive part to the light detection part is short, light dispersed by the dispersive part may be accurately concentrated on a predetermined position of the light detection part. Further, the respective spectroscopic units share the common reflection part, and thus miniaturization of the spectrometer may be attempted. Therefore, according to the spectrometer, it is possible to achieve efficiency of a detection operation in addition to miniaturization while suppressing a decrease in detection accuracy.

In the spectrometer in accordance with one aspect of the present invention, the common reflection part may be disposed between the first light passing part and the first light detection part, and between the second light passing part and the second light detection part. According to this configuration, respective parts of the respective spectroscopic units are provided around the common reflection part, and the spectrometer may be further miniaturized.

In the spectrometer in accordance with one aspect of the present invention, the first dispersive part may disperse and reflect light in a first wavelength range to the first light detection part, and the second dispersive part may disperse and reflect light in a second wavelength range different from the first wavelength range to the second light detection part. According to this configuration, lights in different wavelength ranges may be simultaneously detected by the first spectroscopic unit and the second spectroscopic unit. Further, detection accuracy may be improved (resolving power may be increased) by allocating the different spectroscopic units to respective wavelength ranges.

In the spectrometer in accordance with one aspect of the present invention, the spectrometer may further include a polarizing part disposed on an optical path of light reaching the first reflection part via the first light passing part and an optical path of light reaching the second reflection part via the second light passing part, the polarizing part having a transmission axis forming a predetermined angle with respect to each of the first reference line and the second reference line, wherein the first dispersive part may have a plurality of grating grooves arranged along the first reference line, and the first light detection part may have a plurality of light detection channels arranged along the first reference line in the first spectroscopic unit, and the second dispersive part may have a plurality of grating grooves arranged along the second reference line, and the second light detection part may have a plurality of light detection channels arranged along the second reference line in the second spectroscopic unit. According to this configuration, lights in different polarization states may be simultaneously detected by the first spectroscopic unit and the second spectroscopic unit.

In the spectrometer in accordance with one aspect of the present invention, the first light passing part, the first light detection part, the second light passing part, the second light detection part, and the common reflection part may be provided on an integrally formed substrate. According to this configuration, it is possible to simplify a configuration of the spectrometer and to stabilize a positional relationship of respective members.

Advantageous Effects of Invention

According to the present invention, it is possible to provide a spectrometer capable of attempting efficiency of a detection operation in addition to miniaturization while suppressing a decrease in detection accuracy.

DESCRIPTION OF EMBODIMENTS

Figure 1:
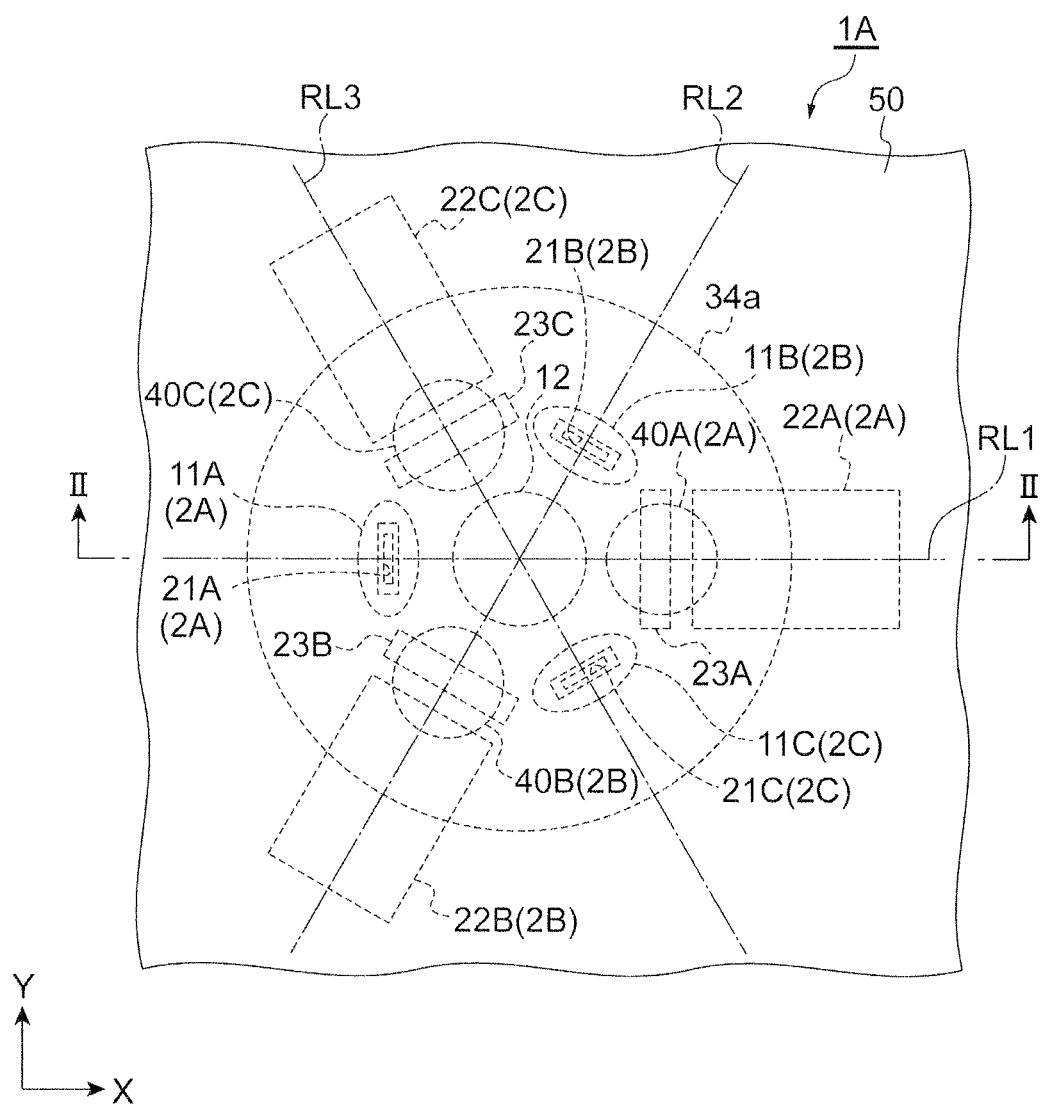
FIG. 1 is a diagram illustrating a portion of a plan view of a spectrometer in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

FIG. 1 is a diagram illustrating a portion of a plan view of a spectrometer 1A. As illustrated in FIG. 1, the spectrometer 1A includes a plurality of (three as an example) spectroscopic units 2A, 2B, and 2C. The respective spectroscopic units 2A, 2B, and 2C are provided to be able to detect lights in different wavelength ranges. The spectroscopic unit (first spectroscopic unit) 2A has a light passing part (first light passing part) 21A, a reflection part (first reflection part) 11A, a common reflection part 12, a dispersive part (first dispersive part) 40A, and a light detection part (first light detection part) 22A. Similarly; the spectroscopic units (second spectroscopic units) 2B and 2C have light passing parts (second light passing parts) 21B and 21C, reflection parts (second reflection parts) 11B and 11C, the common reflection part 12, dispersive parts (second dispersive parts) 40B and 40C, and light detection parts (second light detection parts) 22B and 22C. The common reflection part 12 is shared by the respective spectroscopic units 2A, 2B, and 2C.

The common reflection part 12 has a circular shape when viewed in an optical axis direction of light passing through the respective light passing parts 21A, 21B, and 21C (Z-axis direction). The common reflection part 12 is disposed between the light passing part 21A and the light detection part 22A, between the light passing part 21B and the light detection part 22B, and between the light passing part 21C and the light detection part 22C. In addition, the respective parts of the spectroscopic unit 2A (the light passing part 21A, the reflection part 11A, the dispersive part 40A, and the light detection part 22A) are arranged side by side in a linear shape along a reference line (first reference line) RL1 when viewed in the Z-axis direction. The respective parts of the spectroscopic unit 2B are arranged side by side in a linear shape along a reference line (second reference line) RL2 extending an axial direction shifted clockwise from the reference line RL1 by 120° when viewed in the Z-axis direction. The respective parts of the spectroscopic unit 2C are arranged side by side in a linear shape along a reference line RL3 extending an axial direction shifted clockwise from the reference line RL1 by 240° when viewed in the Z-axis direction. In this way, the reference lines RL1, RL2, and RL3 intersect with one another in the common reflection part 12 when viewed in the Z-axis direction. In the spectrometer 1A, by way of example, the reference lines RL1, RL2, and RL3 intersect with one another at a central location of the common reflection part 12 when viewed in the Z-axis direction. In addition, the respective parts of the spectroscopic units 2A, 2B, and 2C are provided to surround the common reflection part 12 when viewed in the Z-axis direction. The respective parts of the spectroscopic units 2A, 2B, and 2C (e.g., the light detection parts 22A, 22B, and 22C) are provided at equal intervals (at 120° intervals) on a circumference around the central location of the common reflection part 12.

Figure 2:
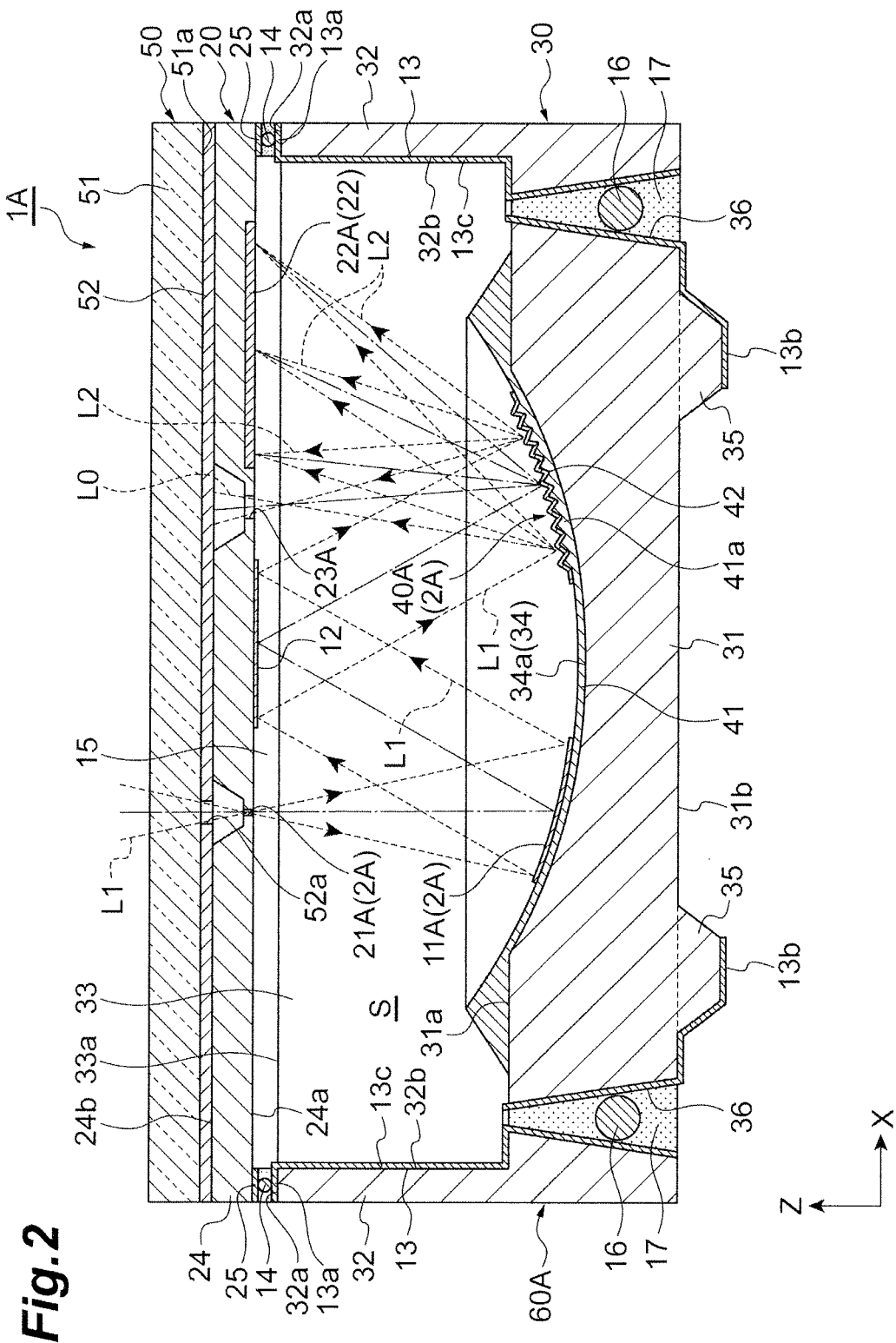
FIG. 2 is a sectional view of the spectrometer taken along the line of FIG. 1.

As illustrated in FIG. 1 and FIG. 2, the spectrometer 1A includes a light detection element 20, a support 30, and a cover 50. The light detection element 20 is provided with the light passing parts 21A, 21B, and 21C, the light detection parts 22A, 22B, and 22C, and zero-order light capture parts 23A, 23B, and 23C. The support 30 is provided with wirings 13 for inputting/outputting electrical signals to/from the light detection parts 22A, 22B, and 22C. The support 30 is secured to the light detection element 20 such that a space S is formed among the light passing parts 21A, 21B, and 21C, the light detection parts 22A, 22B, and 22C, and the zero-order light capture parts 23A, 23B, and 23C. For example, when an axial line direction of the reference line RL1 is set to an X-axis direction, and a direction perpendicular to the X-axis direction and the Z-axis direction is set to a Y-axis direction, the spectrometer 1A is formed in a shape of a rectangular parallelepiped, a length of which in each of an X-axis direction, a Y-axis direction, and a Z-axis direction is less than or equal to 10 mm. The wirings 13 and the support 30 are configured as a molded interconnect device (MID).

In the spectrometer 1A, light L1 passing through the light passing part 21A is reflected by the reflection part 11A and the common reflection part 12 in sequence, enters the dispersive part 40A, and is dispersed and reflected by the dispersive part 40A. Then, light L2 other than zero-order light L0 in the light dispersed and reflected by the dispersive part 40A enters the light detection part 22A and is detected by the light detection part 22A. The zero-order light L0 in the light dispersed and reflected by the dispersive part 40A enters the zero-order light capture part 23A and is captured by the zero-order light capture part 23A. An optical path of the light L1 from the light passing part 21A to the dispersive part 40A, an optical path of the light L2 from the dispersive part 40A to the light detection part 22A, and an optical path of the zero-order light L0 from the dispersive part 40A to the zero-order light capture part 23A are formed in the space S.

Light passing through the light passing part 21B is reflected by the reflection part 11B and the common reflection part 12 in sequence, enters the dispersive part 40B, and is dispersed and reflected by the dispersive part 40B. Then, light other than zero-order light in the light dispersed and reflected by the dispersive part 40B enters the light detection part 22B and is detected by the light detection part 22B. The zero-order light in the light dispersed and reflected by the dispersive part 40B enters the zero-order light capture part 23B, and is captured by the zero-order light capture part 23B. An optical path of light from the light passing part 21B to the dispersive part 40B, an optical path of light from the dispersive part 40B to the light detection part 22B, and an optical path of zero-order light from the dispersive part 40B to the zero-order light capture part 23B are formed in the space S.

Light passing through the light passing part 21C is reflected by the reflection part 11C and the common reflection part 12 in sequence, enters the dispersive part 40C, and is dispersed and reflected by the dispersive part 40C. Then, light other than zero-order light in the light dispersed and reflected by the dispersive part 40C enters the light detection part 22C and is detected by the light detection part 22C. The zero-order light in the light dispersed and reflected by the dispersive part 40C enters the zero-order light capture part 23C and is captured by the zero-order light capture part 23C. An optical path of light from the light passing part 21C to the dispersive part 40C, an optical path of light from the dispersive part 40C to the light detection part 22C, and an optical path of zero-order light from the dispersive part 40C to the zero-order light capture part 23C are formed in the space S.

The light detection element 20 has a substrate 24. For example, the substrate 24 is formed in a rectangular plate shape using a semiconductor material such as silicone, etc. The light passing parts 21A, 21B, and 21C and the zero-order light capture parts 23A, 23B, and 23C are slits formed in the substrate 24. The light passing part 21A extends in the Y-axis direction. The light passing parts 21B and 21C extend in axial directions shifted clockwise from the Y-axis direction by 120° and 240°, respectively when viewed in the Z-axis direction. The zero-order light capture part 23A extends in the Y-axis direction between the light passing part 21A and the light detection part 22A. The zero-order light capture parts 23B and 23C extend in axial directions shifted clockwise from the Y-axis direction by 120° and 240° between the light passing parts 21B and 21C and the light detection parts 22B and 22C, respectively, when viewed in the Z-axis direction.

An end part of the light passing part 21A on an entrance side of the light L1 widens toward the entrance side of the light L t in each of the X-axis direction and Y-axis direction. End parts of the light passing parts 21B and 21C on an entrance side of light widen similarly to the end part of the light passing part 21A on the entrance side of the light L1. In addition, an end part of the zero-order light capture part 23A on the opposite side from an entrance side of the zero-order light L0 widens toward the opposite side from the entrance side of the zero-order light L0 in each of the X-axis direction and the Y-axis direction. When the zero-order light L0 is configured to obliquely enter the zero-order light capture part 23A, it is possible to more reliably inhibit the zero-order light L0 entering the zero-order light capture part 23A from returning to the space S. End parts of the zero-order light capture parts 23B and 23C on the opposite side from an entrance side of the zero-order light L0 widen similarly to the end part of the zero-order light capture part 23A on the opposite side from the entrance side of the zero-order light L0, and have similar effect.

The light detection parts 22A, 22B, and 22C are provided on a surface 24a of the substrate 24 on the space S side. More specifically, the light detection parts 22A, 22B, and 22C are put in the substrate 24 made of a semiconductor material rather than being attached to the substrate 24. That is, the light detection parts 22A, 22B, and 22C include a plurality of photodiodes formed in a first conductivity type region inside the substrate 24 made of the semiconductor material and a second conductivity type region provided within the region. For example, the light detection parts 22A, 22B, and 22C are configured as a photodiode array, a C-MOS image sensor, a CCD image sensor, etc., and each of the light detection parts 22A, 22B, and 22C has a plurality of light detection channels arranged along the reference lines RL1, RL2, and RL3. Lights L2 having different wavelengths are let into the respective light detection channels of the light detection part 22A. Similarly to the respective light detection channels of the light detection part 22A, lights in different wavelengths are let into the respective light detection channels of the light detection parts 22B and 22C.

A plurality of terminals 25 for inputting/outputting electrical signals to/from the light detection parts 22A, 22B, and 22C are provided on the surface 24a of the substrate 24. The light detection parts 22A, 22B, and 22C may be configured as surface-incident photodiodes or back surface-incident photodiodes. For example, when the light detection parts 22A, 22B, and 22C are configured as the surface-incident photodiodes, the light detection parts 22A, 22B, and 22C are positioned at the same heights as those of light exits of the light passing parts 21A, 21B, and 21C (that is, the surface 24a of the substrate 24 on the space S side). In addition, for example, when the light detection parts 22A, 22B, and 22C are configured as the back surface-incident photodiodes, the light detection parts 22A, 22B, and 22C are positioned at the same heights as those of light entrances of the light passing parts 21A, 21B, and 21C (that is, a surface 24b of the substrate 24 on the opposite side from the space S side). Further, the light detection parts 22A, 22B, and 22C may be formed by putting both the surface-incident photodiodes and the back surface-incident photodiodes in one substrate 24 made of the semiconductor material. In this case, at least one surface-incident photodiode and at least one back surface-incident photodiode are included in the light detection parts 22A, 22B, and 22C. Herein, the back surface-incident photodiode has higher detection sensitivity of light in a long wavelength range than that of the surface-incident photodiode. Therefore, when the light detection parts 22A, 22B, and 22C are formed by putting both the surface-incident photodiode and the back surface-incident photodiode in the substrate 24, it is possible to easily produce the spectrometer 1A that detects lights in different wavelength ranges.

In addition, the light detection parts 22A, 22B, and 22C may be configured as detector chips of a different material from that of the substrate 24. For example, the light detection parts 22A, 22B, and 22C may be formed by providing a detector chip made of a different material from that of the substrate 24 such as GaAs, InGsAs, etc. on the surface 24a side of the substrate 24 using bump bonding, etc. In addition, such a detector chip may be provided on the surface 24b of the substrate 24 on the opposite side from the space S side. In this case, for example, it is possible to adopt a configuration in which a through hole is provided in the substrate 24 made of silicone, etc., and light passing through the through hole is detected by a detector chip (GaAs, etc.). Further, the light detection parts 22A, 22B, and 22C may be formed by providing a silicone detector chip and a GaAs detector chip on the substrate 24. In this case, the substrate 24 may not be a semiconductor substrate.

The support 30 has a base wall part 31, a pair of side wall parts 32, and a pair of side wall parts 33. The base wall part 31 opposes the light detection element 20 in the Z-axis direction through the space S. A depression 34 open to the space S side, a plurality of projections 35 protruding to the opposite side from the space S side, and a plurality of through holes 36 open to the space S side and the opposite side from the space S side are formed in the base wall part 31. The pair of side wall parts 32 opposes each other in the X-axis direction through the space S. The pair of side wall parts 33 opposes each other in the Y-axis direction through the space S. The base wall part 31, the pair of side wall parts 32, and the pair of side wall parts 33 are integrally formed using ceramic such as AlN, $Al_2O_3$, etc.

The reflection parts 11A, 11B, and 11C are provided in the support 30. More specifically, the reflection parts 11A, 11B, and 11C are provided in a spherical region on an inner surface 34a of the depression 34 of the base wall part 31 with a molded layer 41 interposed therebetween. For example, the reflection part 11A is a concave mirror including a metal evaporated film of Al, Au, etc. and having a mirror surface. The reflection part 11A reflects the light L1 passing through the light passing part 21A to the common reflection part 12 in the space S. The reflection parts 11B and 11C are also concave mirrors similarly to the reflection part 11A, and reflect lights passing through the light passing parts 21B and 21C to the common reflection part 12 in the space S. The reflection parts 11A, 11B, and 11C may be directly formed on the inner surface 34a of the depression 34 of the support 30 without the molded layer 41 interposed therebetween.

The common reflection part 12 is provided on the light detection element 20. More specifically, the common reflection part 12 is provided in a region between the light passing parts 21A, 21B, and 21C and the zero-order light capture parts 23A, 23B, and 23C on the surface 24a of the substrate 24. For example, the common reflection part 12 is a planar mirror including a metal evaporated film of Al, Au, etc. and having a mirror surface. The common reflection part 12 reflects the light L1, which is reflected by the reflection part 11A, to the dispersive part 40A in the space S. In addition, the common reflection part 12 reflects lights, which are reflected by the reflection parts 11B and 11C, to the dispersive parts 40B and 40C in the space S. In this way, the common reflection part 12 is shared by the respective spectroscopic units 2A, 2B, and 2C to be used for second-stage reflection of light (reflection of light reflected by the reflection parts 11A, 11B, and 11C).

The dispersive parts 40A, 40B, and 40C are provided in the support 30. Details thereof are described below. That is, the molded layer 41 is disposed to cover the depression 34 on a surface 31a of the base wall part 31. The molded layer 41 is formed into a film along the inner surface 34a of the depression 34. For example, a grating pattern 41a corresponding to a blazed grating having a serrated cross section, a binary grating having a rectangular cross section, a holographic grating having a sinusoidal cross section, etc. is formed in a predetermined region of the molded layer 41 corresponding to a spherical region on the inner surface 34a. For example, a reflecting film 42 including a metal evaporated film of Al, Au, etc. is formed on the surface of the molded layer 41 to cover the grating pattern 41a. The reflecting film 42 is formed along a shape of the grating pattern 41a. A surface of the reflecting film 42, which is formed along the shape of the grating pattern 41a, on the space S side serves as the dispersive parts 40A, 40B, and 40C in the form of a reflection grating. The molded layer 41 is formed by pressing a mold die against a molding material (e.g., photocuring epoxy resins, acrylic resins, fluorine-based resins, silicone, and replica optical resins such as organic/inorganic hybrid resins) and curing the molding material (e.g., photocuring using UV light, etc., thermal curing, etc.) in this state.

As described in the foregoing, the dispersive parts 40A, 40B, and 40C are provided on the inner surface 34a of the depression 34 in the surface 31a of the base wall part 31. The dispersive parts 40A, 40B, and 40C have a plurality of grating grooves arranged along the reference lines RL1, RL2, and RL3. The dispersive part 40A disperses and reflects the light L1, which is reflected by the common reflection part 12, to the light detection part 22A in the space S. In addition, the dispersive parts 40B and 40C disperse and reflect lights, which are reflected by the common reflection part 12, to the light detection parts 22B and 22C in the space S. The dispersive parts 40A, 40B, and 40C are not restricted to dispersive parts directly formed in the support 30 as described above. For example, the dispersive part 40A, 40B, and 40C may be provided in the support 30 by attaching a dispersive element, which has the dispersive parts 40A, 40B, and 40C and a substrate on which the dispersive parts 40A, 40B, and 40C are formed, to the support 30. The dispersive parts 40A, 40B, and 40C may be formed on one substrate or a plurality of substrates.

In the spectroscopic units 2A, 2B, and 2C, for example, wavelength ranges of lights detected by the light detection parts 22A, 22B, and 22C are determined based on shapes of grating patterns of the dispersive parts 40A, 40B, and 40C, arrangement of light detection channels of the light detection parts 22A, 22B, and 22C, etc. In the spectroscopic units 2A, 2B, and 2C, the light detection parts 22A, 22B, and 22C are provided to detect lights in different wavelength ranges by adjusting pitches, shapes, etc. of grating patterns, arrangement of light detection channels, etc. at the time of manufacturing the spectrometer 1A. For example, while the dispersive part 40A is provided to disperse and reflect light in a first wavelength range (e.g., a wavelength range of 180 to 400 nm) to the light detection part 22A, the dispersive parts 40B and 40C are provided to disperse and reflect lights in a second wavelength range (e.g., wavelength ranges of 340 to 780 nm and 600 to 1050 nm) to the light detection parts 22B and 22C.

Each wiring 13 has an end part 13a on a side of the light detection parts 22A, 22B, and 22C, an end part 13b on the opposite side from the side of the light detection parts 22A, 22B, and 22C, and a connection part 13c. The end part 13a of each wiring 13 is located on an end surface 32a of each side wall part 32 to oppose each terminal 25 of the light detection element 20. The end part 13b of each wiring 13 is located on a surface of each projection 35 in a surface 31b of the base wall part 31 on the opposite side from the space S side. The connection part 13c of each wiring 13 reaches the end part 13b from the end part 13a on a surface 32b of each side wall part 32 on the space S side, the surface 31a of the base wall part 31, and an inner surface of each through hole 36. The connection part 13c of each wiring 13 may be provided along an inside of the support 30 (the surface 32b of each side wall part 32 and the surface 31a of the base wall part 31) as in the present embodiment, may be provided to pass an outside of the support 30, or may be provided to penetrate into the support 30.

For example, the terminal 25 of the light detection element 20 and the end part 13a of the wiring 13 opposing each other are connected to each other by a bump 14 made of Au, solder, etc. In the spectrometer 1A, the support 30 is fixed to the light detection element 20, and a plurality of wirings 13 is electrically connected to the light detection parts 22A, 22B, and 22C of the light detection element 20 by a plurality of bumps 14. In this way, the end part 13a of each wiring 13 is connected to each terminal 25 of the light detection element 20 in a fixed part of the light detection element 20 and the support 30.

The cover 50 is fixed to the surface 24b of the substrate 24 of the light detection element 20 on the opposite side from the space S side. The cover 50 has a light transmitting member 51 and a light shielding film 52. For example, the light transmitting member 51 is formed in a rectangular plate shape using a material which transmits the light L1 therethrough, examples of which include silica, borosilicate glass (BK7), Pyrex (registered trademark) glass, and Kovar glass. The light shielding film 52 is formed on a surface 51a of the light transmitting member 51 on the space S side. A light transmitting opening 52a is formed in the light shielding film 52 to oppose the light passing part 21A of the light detection element 20 in the Z-axis direction. The light transmitting opening 52a is a slit formed in the light shielding film 52, and extends in the Y-axis direction. In addition, in the light shielding film 52, light transmitting openings (slits) similar to the light transmitting opening 52a are formed at positions opposing the light passing parts 21B and 21C of the light detection element 20 in the Z-axis direction. The light transmitting openings formed to oppose the light passing parts 21B and 21C extend in axial directions shifted clockwise from the Y-axis direction by 120° and 240°, respectively, when viewed in the Z-axis direction.

When an infrared ray is detected, silicon, germanium, etc. is effective as a material of the light transmitting member 51. In addition, the light transmitting member 51 may be provided with an AR (Anti Reflection) coat, and may have a filter function as to transmit therethrough only a predetermined wavelength of light. Further, for example, a black resist, A1, etc. may be used as a material of the light shielding film 52. Here, the black resist is effective as the material of the light shielding film 52 from a viewpoint that the zero-order light L0 entering the zero-order light capture part 23A and zero-order light entering the zero-order light capture parts 23B and 23C are inhibited from returning to the space S.

In addition, the cover 50 may further have a light shielding film formed on a surface of the light transmitting member 51 on the opposite side from the space S side. In this case, when light transmitting openings are formed in the light shielding film to oppose the light passing parts 21A, 21B, and 21C of the light detection element 20 in the Z-axis direction, the entrance NA of light entering the space S may be more accurately defined using the light transmitting openings of the light shielding film, the light transmitting opening 52a of the light shielding film 52, and the light passing parts 21A, 21B, and 21C of the light detection element 20. Similarly to the light shielding film 52, for example, a black resist, A1, etc. may be used as a material of the light shielding film. Further, when the cover 50 further has the above-described light shielding film, light transmitting openings may be formed in the light shielding film 52 to oppose the zero-order light capture parts 23A, 23B, and 23C of the light detection element 20 in the Z-axis direction. In this case, zero-order light entering the zero-order light capture parts 23A, 23B, and 23C may be more reliably inhibited from returning to the space S.

For example, a sealing member 15 made of resin, etc. is disposed among the surface 24a of the substrate 24, the end surface 32a of each side wall part 32, and the end surface 33a of each side wall part 33. In addition, for example, a sealing member 16 made of glass beads, etc. is disposed inside the through hole 36 of the base wall part 31, and the inside of the through hole 36 is filled with a sealing member 17 made of resin. In the spectrometer 1A, the space S is airtightly sealed by a package 60A that includes the light detection element 20, the support 30, the cover 50, and the sealing members 15, 16, and 17 as components. When the spectrometer 1A is mounted on an external circuit board, the end part 13b of each wiring 13 functions as an electrode pad. The light passing parts 21A, 21B, and 21C and the zero-order light capture parts 23A, 23B, and 23C of the substrate 24 may be airtightly sealed by filling the light passing parts 21A, 21B, and 21C and the zero-order light capture parts 23A, 23B, and 23C of the substrate 24 with light transmitting resin in place of disposing the cover 50 on the surface 24b of the substrate 24. In addition, for example, the inside of the through hole 36 of the base wall part 31 may be filled with only the sealing member 17 made of the resin without disposing the sealing member 16 made of the glass beads, etc.

As described in the foregoing, in the spectrometer 1A, lights in a plurality of different wavelength ranges may be simultaneously detected, and lights in a plurality of different wavelength ranges may be measured by one spectrometer 1A using the plurality of spectroscopic units 2A, 2B, and 2C, and thus efficiency of a detection operation may be attempted. In addition, in the respective spectroscopic units 2A, 2B, and 2C, lights passing through the light passing parts 21A, 21B, and 21C are reflected by the reflection parts 11A, 11B, and 11C and the common reflection part 12 in sequence, and enter the dispersive parts 40A, 40B, and 40C. In this way, incident directions of the lights entering the dispersive parts 40A, 40B, and 40C and divergence or convergence states of the lights may be easily adjusted. Thus, in the respective spectroscopic units 2A, 2B, and 2C, even when lengths of optical paths from the dispersive parts 40A, 40B, and 40C to the light detection parts 22A, 22B, and 22C are short, lights dispersed by the dispersive parts 40A, 40B, and 40C may be accurately concentrated on predetermined positions of the light detection parts 22A, 22B, and 22C. Further, the respective spectroscopic units 2A, 2B, and 2C share the common reflection part 12, and respective parts of the respective spectroscopic units 2A, 2B, and 2C are provided around the common reflection part 12. Thus, miniaturization of the spectrometer 1A may be attempted. Therefore, according to the spectrometer 1A, it is possible to achieve efficiency of a detection operation in addition to miniaturization while suppressing a decrease in detection accuracy.

In addition, in the spectrometer 1A, the light passing parts 21A, 21B, and 21C, the common reflection part 12, and the light detection parts 22A, 22B, and 22C are formed in advance in the light detection element 20. Further, the reflection parts 11A, 11C, and 11B and the gratings (the dispersive parts 40A, 40B, and 40C) are formed in advance in the support 30. Therefore, optical paths from entrance slits (the light passing parts 21A, 21B, and 21C) to the tight detection parts 22A, 22B, and 22C are easily formed only by fixing the light detection element 20 and the support 30 to each other.

In addition, in the spectrometer 1A, the respective spectroscopic units 2A, 2B, and 2C have the dedicated light passing parts 21A, 21B, and 21C, respectively. For this reason, when compared to a case in which one light passing part is shared by a plurality of spectroscopic units, sufficient amounts of lights enter the respective spectroscopic units 2A, 2B, and 2C, and detection accuracy is improved.

In addition, in the spectrometer 1A, the dispersive part 40A is configured to disperse and reflect the light in the first wavelength range to the light detection part 22A, and the dispersive parts 40B and 40C are configured to disperse and reflect the light in the second wavelength range, which is different from the first wavelength range, to the light detection parts 22B and 22C. In this way, lights in different wavelength ranges may be simultaneously detected by the spectroscopic unit 2A and the spectroscopic units 2B and 2C. Further, detection accuracy may be improved (resolving power may be increased) by allocating the different spectroscopic units 2A, 2B, and 2C to respective wavelength ranges.

In addition, in the spectrometer 1A, the light passing parts 21A, 21B, and 21C and the light detection parts 22A, 22B, and 22C are provided on the substrate 24 which is integrally formed. According to this configuration, it is possible to simplify a configuration of the spectrometer 1A and to stabilize a positional relationship of respective members.

In addition, in the spectroscopic unit 2A of the spectrometer 1A, the reflection part 11A is the concave mirror. In this way, a spread angle of light is suppressed by the reflection part 11A, and thus the entrance NA of the light L1 passing through the light passing part 21A may be increased to increase sensitivity, and the length of an optical path from the dispersive part 40A to the light detection part 22A may be further decreased to further miniaturize the spectrometer. Details thereof are described below. That is, when the reflection part 11A is the concave mirror, the dispersive part 40A is irradiated with the light L1 while the light L1 is approximately collimated. For this reason, a distance at which the dispersive part 40A concentrates the light L2 on the light detection part 22A is short when compared to a case in which the dispersive part 40A is irradiated with the light L1 while the light L1 spreads. Therefore, the entrance NA of the light L1 may be increased to increase sensitivity, and the optical path length from the dispersive part 40A to the light detection part 22A may be further decreased to further miniaturize the spectrometer. This description is similarly applied to the spectroscopic units 2B and 2C.

In addition, in the spectrometer 1A, the support 30 is provided with the wirings 13 electrically connected to the light detection parts 22A, 22B, and 22C. In addition, the end part 13a of the wiring 13 on the side of the light detection parts 22A, 22B, and 22C is connected to the terminal 25 provided in the light detection element 20 in the fixed part of the light detection element 20 and the support 30. In this way, the electrical connection between the light detection parts 22A, 22B, and 22C and the wirings 13 may be secured.

In addition, in the spectrometer 1A, a material of the support 30 is ceramic. In this way, it is possible to suppress expansion and contraction of the support 30 resulting from a temperature change of an environment in which the spectrometer 1A is used, generation of heat in the light detection parts 22A, 22B, and 22C, etc. Therefore, it is possible to suppress a decrease in detection accuracy (a shift of a peak wavelength in lights detected by the light detection parts 22A, 22B, and 22C, etc.) resulting from occurrence of a variance in positional relationship between the dispersive parts 40A, 40B, and 40C and the light detection parts 22A, 22B, and 22C. Since the spectrometer 1A is miniaturized, there is concern that a slight change in an optical path may greatly affect an optical system, leading to a decrease in detection accuracy. For this reason, in particular, as described in the foregoing, when the dispersive parts 40A, 40B, and 40C are directly formed in the support 30, it is significantly important to suppress expansion and contraction of the support 30.

In addition, in the spectrometer 1A, the space S is airtightly sealed by the package 60A that includes the light detection element 20 and the support 30 as components. In this way, it is possible to suppress a decrease in detection accuracy resulting from deterioration of a member in the space S due to moisture, occurrence of condensation in the space S due to a decrease in ambient temperature, etc.

In addition, in the spectrometer 1A, a flat region (which may be slightly inclined) is present around the depression 34 on the surface 31a of the base wall part 31. In this way, even when reflected light is generated in the light detection parts 22A, 22B, and 22C, the reflected light may be inhibited from reaching the light detection parts 22A, 22B, and 22C again. Further, when the molded layer 41 is formed on the inner surface 34a of the depression 34 by pressing a mold die against resin, and when the sealing member 15 made of resin is disposed among the surface 24a of the substrate 24, the end surface 32a of each side wall part 32, and the end surface 33a of each side wall part 33, the flat region serves as a shelter for surplus resin. In this instance, when the surplus resin is allowed to flow into the through hole 36 of the base wall part 31, for example, the sealing member 16 made of the glass beads, etc. is unnecessary, and the resin functions as the sealing member 17.

Second Embodiment

Figure 3:
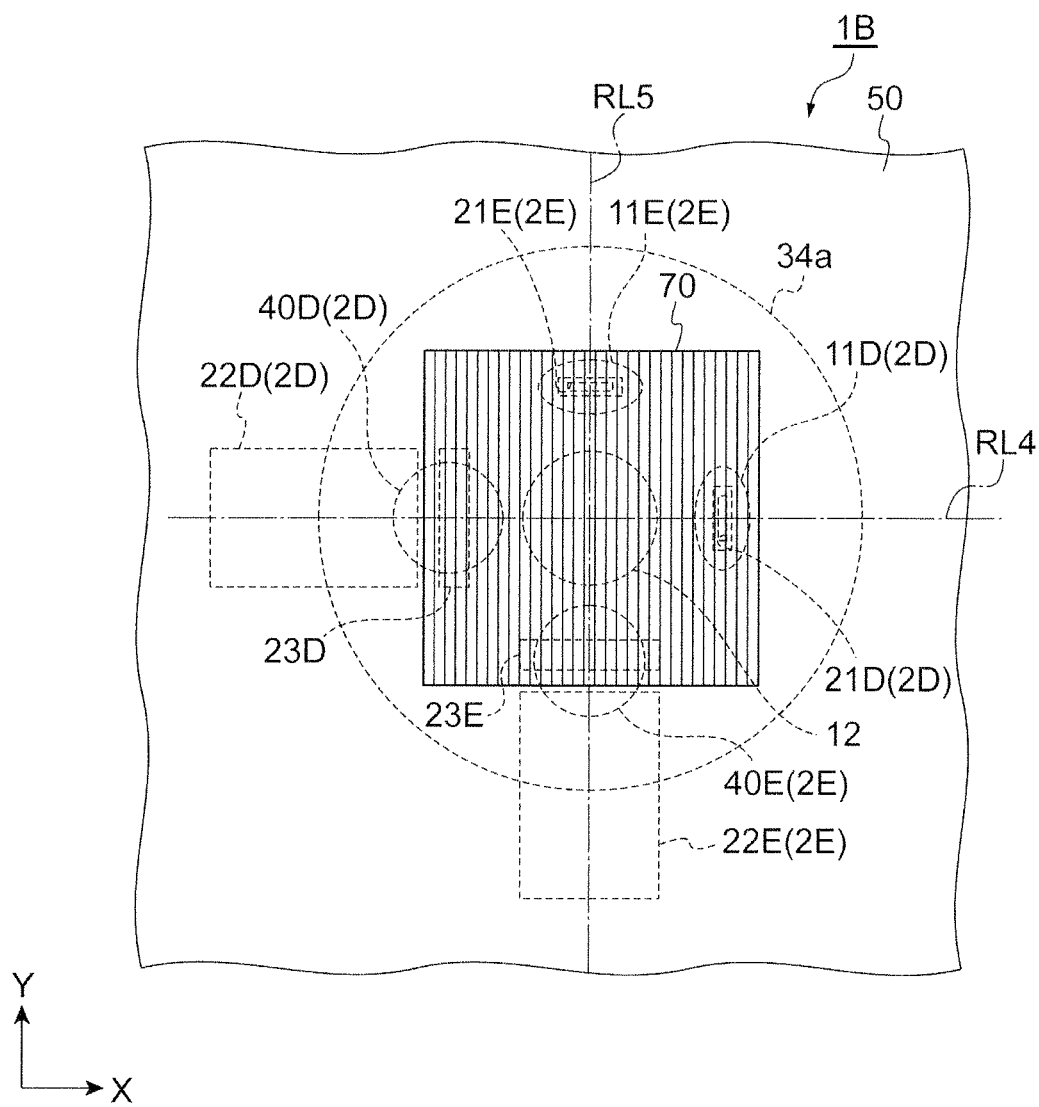
FIG. 3 is a diagram illustrating a portion of a plan view of a spectrometer in accordance with a second embodiment of the present invention.

As illustrated in FIG. 3, a spectrometer 1B is provided with a spectroscopic unit 2D in which respective parts (a light passing part 21D, a reflection part 11D, a dispersive part 40D, and a light detection part 22D) are disposed along a reference line RL4 extending in an X-axis direction, and a spectroscopic unit 2E in which respective parts (a light passing part 21E, a reflection part 11E, a dispersive part 40E, and a light detection part 22E) are disposed along a reference line RL5 shifted from the reference line RL4 by 90° when viewed in a Z-axis direction. The spectroscopic units 2D and 2E are provided such that wavelength ranges of lights detected by the respective light detection parts 22D and 22E are the same. In addition, in the spectroscopic unit 2D, the dispersive part 40D has a plurality of grating grooves arranged along the reference line RL4, and the light detection part 22D has a plurality of light detection channels arranged along the reference line RL4. Further, in the spectroscopic unit 2E, the dispersive part 40E has a plurality of grating grooves arranged along the reference line RL5, and the light detection part 22E has a plurality of light detection channels arranged along the reference line RL5.

The spectrometer 1B is provided with a polarizing part 70, which is disposed on an optical path of light reaching the reflection parts 11D and 11E via the light passing parts 21D and 21E and has a transmission axis forming predetermined angles (herein 90° and 0° as an example) with respect to the respective reference lines RL4 and RL5. For example, the polarizing part 70 is a polarizing plate, and transmits therethrough only light vibrating in a direction of the transmission axis (linearly polarized light, a polarization direction of which is parallel to the transmission axis). Herein, the polarization direction refers to a direction in which an electric field (and a magnetic field) vibrates with respect to a direction in which light travels.

For example, the polarizing part 70 may be fixed to an outside of a light transmitting member 51 of the spectrometer 1B (the opposite side from a light shielding film. 52 in the light transmitting member 51), may be provided between the light transmitting member 51 and the light shielding film 52, or may be provided between the light shielding film 52 and a substrate 24. The polarizing part 70 may be disposed on an outside of the substrate 24 on which the light passing parts 21D and 21E are provided as described above (on the light shielding film 52 side of the substrate 24), or may be disposed to overlap the respective light passing parts 21D and 21E on an inside of the substrate 24 on which the light passing parts 21D and 21E are provided. In addition, the polarizing part 70 may be a member that is integrally formed or a member that includes a plurality of members. Alternatively, the light transmitting member 51 may be configured to have a function of the polarizing part 70.

In the spectrometer 1B configured as above, the spectroscopic units 2D and 2E are configured such that a wavelength range of light detected by the light detection part 22D of the spectroscopic unit 2D is the same as a wavelength range of light detected by the light detection part 22E of the spectroscopic unit 2E. In addition, in the spectroscopic units 2D and 2E, a direction in which the grating grooves of the dispersive part 40D and the light detection channels of the light detection part 22D are arranged (a direction along the reference line RL4) is shifted by 90° from a direction in which the grating grooves of the dispersive part 40E and the light detection channels of the light detection part 22E are arranged (a direction along a reference line RL5) when viewed in the Z-axis direction. Therefore, polarization states of lights detected by the light detection parts 22D and 22E (angles formed by directions in which the light detection channels of the light detection parts 22D and 22E are arranged and polarization directions of the lights detected by the light detection parts 22D and 22E) are different from each other. Specifically, for example, when a polarization state of light detected by one of the light detection parts 22D and 22E corresponds to vertical polarization (a polarization direction of the detected light is parallel to a direction in which light detection channels are arranged), light detected by the other one corresponds to horizontal polarization (a polarization direction of the detected light is perpendicular to a direction in which light detection channels are arranged). Therefore, lights in the same wavelength range and in different polarization states (e.g., vertically polarized light and horizontally polarized light) may be simultaneously detected by the spectroscopic unit 2D and the spectroscopic unit 2E, and lights in a plurality of different polarization states may be measured by one spectrometer 1B. According to the spectrometer 1B, for example, it is possible to achieve efficiency of a detection operation when an absorbance of a certain molecule is desired to be measured (detected) in a plurality of different polarization states in a medical field, etc.

Third Embodiment

Figure 4:
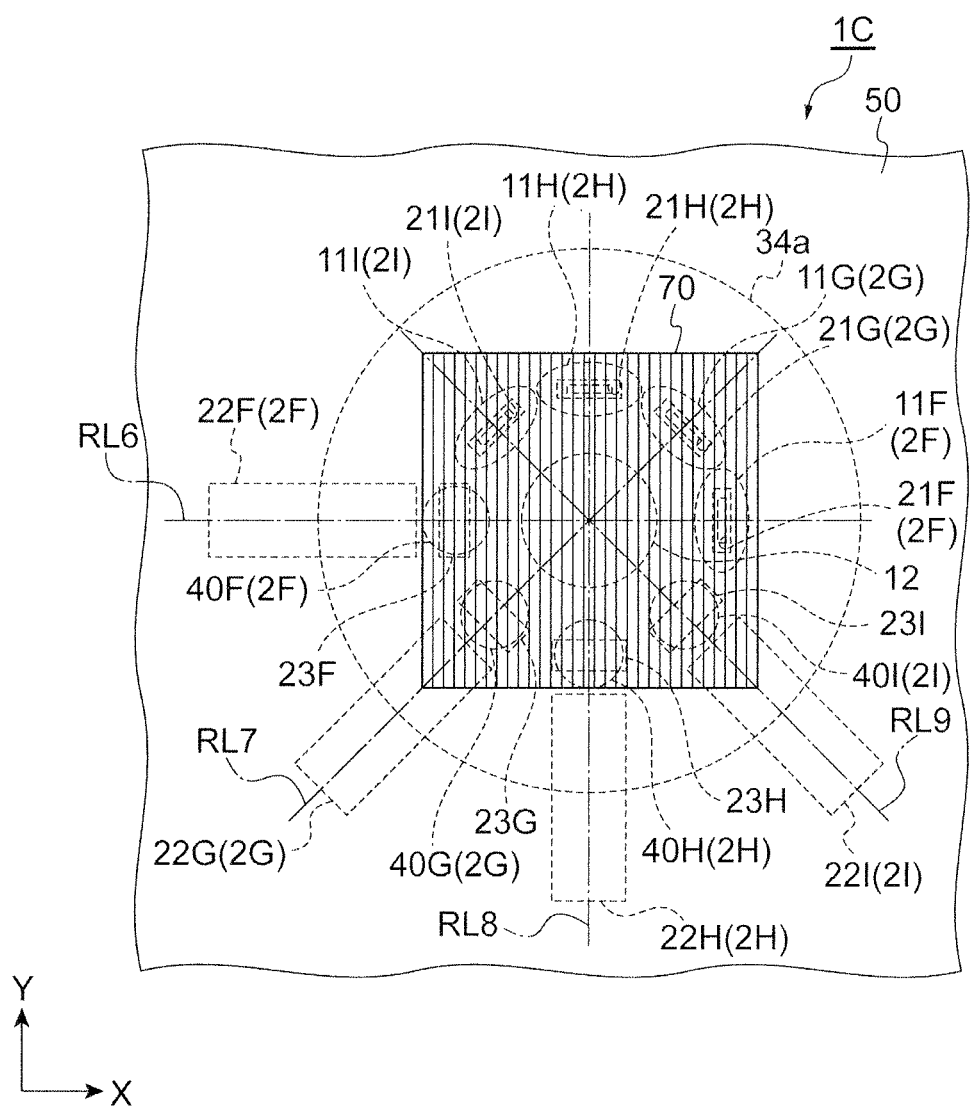
FIG. 4 is a diagram illustrating a portion of a plan view of a spectrometer in accordance with a third embodiment of the present invention.

As illustrated in FIG. 4, a spectrometer 1C differs from the above-mentioned spectrometer 1B mainly in that four spectroscopic units 2F, 2G, 2H, and 2I are included. The spectroscopic unit 2F includes a light passing part 21F, a reflection part 11F, a dispersive part 40F, and a light detection part 22F arranged along a reference line RL6 extending in an X-axis direction when viewed in a Z-axis direction. The spectroscopic unit 2G includes a light passing part 21G, a reflection part 11G, a dispersive part 40G, and a light detection part 22G arranged along a reference line RL7 shifted counterclockwise from the reference line RL6 by 45° when viewed in the Z-axis direction. The spectroscopic unit 2H includes a light passing part 22H, a reflection part 11H, a dispersive part 40H, and a light detection part 22I arranged along a reference line RL8 shifted counterclockwise from the reference line RL7 by 45° when viewed in the Z-axis direction. The spectroscopic unit 2I includes a light passing part 21I, a reflection part 11I, a dispersive part 40I, and a light detection part 22I arranged along a reference line RL9 shifted counterclockwise from the reference line RL8 by 45° when viewed in the Z-axis direction. The spectroscopic units 2F, 2G, 2H, and 2I are provided such that wavelength ranges of lights detected by the respective light detection parts 22F, 22G, 22H, and 22I are the same. In addition, in the spectroscopic units 2F, 2G, 2H, and 2I, the dispersive parts 40F, 40G, 40H, and 40I have a plurality of grating grooves arranged along the reference lines RL6, RL7, RL8, and RL9, and the light detection parts 22F, 22G, 22H, and 22I have a plurality of light detection channels arranged along the reference lines RL6, RL7, RL8, and RL9.

In the spectrometer 1C configured as above, directions in which respective parts of the spectroscopic units 2F, 2G, 2H, and 2I are disposed are shifted by 45° when viewed in the Z-axis direction. That is, in the spectrometer 1C, four patterns of lights at 45° intervals may be simultaneously detected at angles (in polarization states) formed by a polarization direction with respect to directions in which the light detection channels of the light detection parts 22F, 22G, 22H, and 22I are arranged. Therefore, according to the spectrometer 1C, it is possible to perform absorbance measurement according to a plurality of different polarization states through one detection operation, and to achieve efficiency of a detection operation.

While the first to third embodiments of the present invention are explained in the foregoing, the present invention is not limited to the above-mentioned embodiments. For example, in the first embodiment described above, wavelength ranges of lights detected by the respective spectroscopic units may be made equal to one another. In this case, a plurality of detection results in the same wavelength range may be acquired through one detection operation. In this way, for example, detection accuracy may be improved by adopting an average of the plurality of detection results as a detection value, or by adopting, as a detection value, an average calculated after excluding a detection value greatly different from a detection result obtained by another spectroscopic unit.

In addition, in the second or third embodiment described above, wavelength ranges of lights detected by the respective spectroscopic units may be made different from one another. In this case, pairs of a plurality of wavelength ranges and polarization states may be detected simultaneously and by one spectrometer, and thus efficiency of a detection operation may be achieved. In addition, the polarizing part 70 may be a polarizing part prepared as a different member from the spectrometers 1B and 1C, and may be a polarizing part attached to the spectrometers 1B and 1C when a detection operation of different polarization states is performed (e.g., a polarizing plate attached to the outside of the cover 50 of the spectrometers 1B and 1C, etc.).

In addition, the light passing part and the light detection part included in the spectroscopic unit may be not provided on the integrally formed substrate 24, and may be separately provided in a plurality of substrate members combined by adhesion, etc. at the time of manufacturing.

In addition, the number of spectroscopic units provided in the spectrometer is not limited to the examples (two to four) illustrated in the above respective embodiments, and five or more spectroscopic units may be provided. Further, intervals at which the respective spectroscopic units are disposed are not limited to the examples illustrated in the above respective embodiments. However, when a distance between light detection parts is set to be as large as possible among the respective spectroscopic units, light in a different wavelength range from a wavelength range to be detected (light to be detected by another spectroscopic unit) may be inhibited from being detected in the respective light detection parts, and a decrease in detection accuracy may be suppressed.

In addition, in the above respective embodiments, the entrance NA of the light L1 entering the space S is defined by the shape of the light passing part 21A of the light detection element 20 (the light transmitting opening 52a of the light shielding film 52, etc. depending on cases) in each spectroscopic unit (e.g., the spectroscopic unit 2A). However, the present invention is not restricted thereto. For example, in the spectroscopic unit 2A, the entrance NA of the light L1 entrance the space S may be substantially defined by adjusting a shape of a region of at least one of the reflection part 11A, the common reflection part 12, and the dispersive part 40A. The light L2 entering the light detection part 22A is diffracted light, and thus the entrance NA may be substantially defined by adjusting a shape of a predetermined region of the molded layer 41 in which the grating pattern 41a is formed. This description is similarly applied to the spectroscopic units 2B to 2I.

In addition, in the spectrometer 1A, the space S may be airtightly sealed by a package accommodating the light detection element 20 and the support 30 in place of the package 60 including the light detection element 20 and the support 30 as components. In this case, it is possible to suppress a decrease in detection accuracy resulting from deterioration of a member in the space S due to moisture, occurrence of condensation in the space S due to a decrease in ambient temperature, etc. Herein, the package may include a stem into which a plurality of lead pins are inserted, and a cap provided with light entrance parts that let lights into the light passing parts 21A to 21C. In addition, when an end part of each lead pin inside the package is connected to the end part 13b of each wiring 13 provided in the support 30, it is possible to implement the electrical connection between a lead pin and a wiring 13 corresponding to each other, and positioning of the light detection element 20 and the support 30 with respect to the package. Since the light detection element 20 and the support 30 are accommodated in the package, the sealing members 15 and 16 may not be disposed, and the cover 50 may not be provided unlike the above-described spectrometer 1A. This description is similarly applied to the spectrometers 1B and 1C.

In addition, the material or the support 30 is not restricted to ceramic. Another molding material, for example, resin such as LCP, PPA, and epoxy, and glass for molding may be used as the material.

Further, when the space S is airtightly sealed by the package that accommodates the light detection element 20 and the support 30, the support 30 may have a plurality of pillar parts or a plurality of side wall parts separated from one another in place of the pair of side wall parts 32 and the pair of side wall parts 33 which surround the space S.

In addition, in the spectroscopic unit in each of the above embodiments (e.g., the spectroscopic unit 2A), the reflection part 11A may be a planar mirror. More specifically, a flat inclined surface may be provided on the inner surface 34a of the depression 34, and the planar mirror serving as the reflection part may be provided on the inclined surface. In this case, resolving power of the light L2 dispersed by the dispersive part 40A may be increased by decreasing the entrance NA of the light L1 passing through the light passing part 21A, and satisfying an inequality of "the optical path length, from the light passing part to the dispersive part, of light having the same spread angle as a spread angle of the light passing through the light passing part">"the optical path length from the dispersive part to the light detection part" is satisfied (optical reduction system). Details thereof are described below. That is, when the reflection part 11A is the planar mirror, the dispersive part 40A is irradiated with the light L1 while the light L1 spreads. For this reason, the entrance NA of the light L1 passing through the light passing part 21A needs to be made small from a viewpoint that a region of the dispersive part 40A is inhibited from widening, and a viewpoint that a distance at which the dispersive part 40A concentrates the light L2 on the light detection part 22A is inhibited from becoming longer. In this regard, resolving power of the light L2 dispersed by the dispersive part 40A may be increased by decreasing the entrance NA of the light L1 and adopting the optical reduction system. This description is similarly applied to the spectroscopic units 2B to 2I.

In addition, in the spectroscopic of each of the above embodiments (e.g., the spectroscopic 1A), description has been given on the assumption that the depression 34 of the base wall part 31, in which the reflection parts 11A, 11B, and 11C and the dispersive parts 40A, 40B, and 40C are formed, is common to all the spectroscopic units 2A, 2B, and 2C. However, depressions of base wall parts may be individually provided for the respective spectroscopic units. In this case, the depressions may be separated from one another. That is, a flat region in which no depression is formed may be formed between the respective depressions. As described above, when a plurality of depressions is formed in the respective spectroscopic units, a design freedom of a radius of curvature of each depression may be increased.

In this way, the spectrometer may be miniaturized when compared to a case in which a depression common to the respective spectroscopic units is formed. Further, a reflection part and a dispersive part may be provided in a flat region inside a base wall part without providing a depression in the base wall part.

In addition, in the above respective embodiments, the terminal 25 of the light detection element 20 and the end part 13a of the wiring 13 opposing each other are connected by the bumps 14. However, the terminal 25 of the light detection element 20 and the end part 13a of the wiring 13 opposing each other may be connected by soldering. As described in the foregoing, materials and shapes of respective components of the spectrometers 1A to 1C are not restricted to the above-described materials and shapes, and various materials and shapes may be applied thereto.

REFERENCE SIGNS LIST 1A, 1B, 1C: spectrometer; 2A, 2B, 2C, 2D, 2E, 2F, 2G, 2H, 2I: spectroscopic unit; 11A, 11B, 11C, 11D, 11E, 11F, 11G, 11H, 11I: reflection part; 12: common reflection part;

21A, 21B, 21C, 21D, 21E, 21F, 21G, 21H: light passing part; 22A, 22B, 22C, 22D, 22E, 22F, 22G, 22H, 22I: light detection part; 24: substrate; 40A, 40B, 40C, 40D, 40E, 40F, 40G, 40H, 40I: dispersive part; 70: polarizing part; RL1, RL2, RL3, RL4, RL5, RL6, RL7, RL8, RL9: reference line.

The invention claimed is:

1. A spectrometer comprising:

a first spectroscopic unit having a first light passing part, a first reflection part reflecting light passing through the first light passing part, a common reflection part reflecting the light reflected by the first reflection part, a first dispersive part dispersing and reflecting the light reflected by the first reflection part and reflected by the common reflection part, and a first light detection part detecting the light dispersed and reflected by the first dispersive part; and a second spectroscopic unit having a second light passing part, a second reflection part reflecting light passing through the second light passing part, the common reflection part reflecting the light reflected by the second reflection part, a second dispersive part dispersing and reflecting the light reflected by the second reflection part and reflected by the common reflection part, and a second light detection part detecting the light dispersed and reflected by the second dispersive part, the first light passing part, the first reflection part, the common reflection part, the first dispersive part, and the first light detection part are arranged along a first reference line when viewed in an optical axis direction of the light passing through the first light passing part, and the second light passing part, the second reflection part, the common reflection part, the second dispersive part, and the second light detection part are arranged along a second reference line intersecting with the first reference line in the common reflection part when viewed in an optical axis direction of the light passing through the second light passing part.

2. The spectrometer according to claim 1, wherein the common reflection part is disposed between the first light passing part and the first light detection part, and between the second light passing part and the second light detection part.

3. The spectrometer according to claim 1, wherein the first dispersive part disperses and reflects light in a first wavelength range to the first light detection part, and the second dispersive part disperses and reflects light in a second wavelength range different from the first wavelength range to the second light detection part.

4. The spectrometer according to claim 1, further comprising a polarizing part disposed on an optical path of light reaching the first reflection part via the first light passing part and an optical path of light reaching the second reflection part via the second light passing part, the polarizing part having a transmission axis forming a predetermined angle with respect to each of the first reference line and the second reference line, wherein the first dispersive part has a plurality of grating grooves arranged along the first reference line, and the first light detection part has a plurality of light detection channels arranged along the first reference line in the first spectroscopic unit, and the second dispersive part has a plurality of grating grooves arranged along the second reference line, and the second light detection part has a plurality of light detection channels arranged along the second reference line in the second spectroscopic unit.

5. The spectrometer according to claim 1, wherein the first light passing part, the first light detection part, the second light passing part, the second light detection part, and the common reflection part are provided on an integrally formed substrate.

* * * * *